US000001147H

United States Statutory Invention Registration [19]

[11] Reg. Number: H1147

[43] Published: Mar. 2, 1993

Kennelley et al.

[54] METHOD OF INHIBITING CORROSION IN OIL FIELD PRODUCED FLUIDS

[76] Inventors: Kevin J. Kennelley, 2712 Dunwick, Plano, Tex. 75023; Eugene R. Thomas, 2505 Harvard, Midland, Tex. 79701; Robert J. Voorhees, 1290 Cliffview Dr., Green River, Wyo. 82935; James D. Watson, 1431 Wakefield, Houston, Tex. 77018; Daniel S. Sullivan, 9114 Tooley Dr., Houston, Tex. 77031

[21] Appl. No.: 635,258

[22] Filed: Dec. 28, 1990

[51] Int. Cl.[5] ..... E21B 37/00

[52] U.S. Cl. ..... 252/8.552; 208/236; 208/237

[58] Field of Search ..... 252/8.552; 208/236, 208/237

[56] References Cited

U.S. PATENT DOCUMENTS

| | | | |
|---|---|---|---|
| 2,768,929 | 10/1956 | Capell et al. | 208/237 X |
| 3,846,311 | 11/1974 | Sharp et al. | 252/8.552 |
| 4,020,144 | 4/1977 | Bosniak | 423/235 X |
| 4,239,630 | 12/1980 | Atkinson et al. | 252/8.552 |
| 4,248,717 | 2/1981 | Sharp et al. | 252/8.552 |
| 4,290,900 | 9/1981 | Sharp et al. | 252/8.552 |
| 4,295,979 | 10/1981 | Sharp et al. | 252/8.555 |
| 4,728,447 | 3/1988 | Labat | 252/8.552 |
| 4,804,485 | 2/1989 | Carroll et al. | 252/8.552 |
| 5,028,343 | 7/1991 | Lindstrom | 252/8.552 |

FOREIGN PATENT DOCUMENTS

| | | | |
|---|---|---|---|
| 3542551 | 6/1986 | Fed. Rep. of Germany | 252/8.552 |
| WO80/02721 | 12/1980 | World Int. Prop. O. | 252/8.552 |

*Primary Examiner*—Gary L. Geist

[57] ABSTRACT

A method for treating a hydrocarbon stream containing free sulfur wherein a formulation comprising a diaryldisulfide and a film forming corrosion inhibitor are introduced into the hydrocarbon stream.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF INHIBITING CORROSION IN OIL FIELD PRODUCED FLUIDS

BACKGROUND OF THE INVENTION

This invention relates generally to the use of corrosion inhibiting composition comprising diaryldisulfide in oil and gas field produced fluids. In one aspect the invention relates to a method for inhibiting corrosion in wells producing gas containing hydrogen sulfide.

The production of oil and natural gas from subterranean formations sometimes contains hydrogen sulfide and/or free sulfur, both of which contribute to corrosion of well tubulars. In addition, free sulphur can deposit and plug the well tubulars (tubing or flow lines) and other production equipment. Tests have shown that corrosion is particularly severe in areas of sulfur deposition. For example, in local regions of the pipe or equipment which are not capable of being scraped, the sulfur deposits which could not be removed caused severe localized corrosion.

In order to prevent sulfur deposition, solvents are sometimes added to the oil to dissolve the sulfur. Such solvents include amine based solvents and dimethyl disulfide ("DMDS").

Laboratory tests have shown that the amine based solvents are not effective in certain applications, (e.g., in the presence of carbon dioxide) and the DMDS solvents are objectionable because of their odor and toxicity. Moreover, the DMDS solvents are expensive and present disposal problems.

Thus, there is a need for a well treatment which inhibits both the buildup of sulfur and the corrosion of production tubulars and equipment.

SUMMARY OF THE INVENTION

The method of the present invention involves the use of a formulation in the treatment of wells producing oil and gas with free sulfur. The formulation comprises a mixture of diaryldisulfides ("DADS") and a film forming corrosion inhibitor. Both components of the formulation contribute to the corrosion protection and the DADS also functions as solvent for the free sulfur.

Laboratory tests indicate that the combination of DADS and the film forming corrosion inhibitor provide better protection on the metal surface of the well tubulars than either compound alone. Although the reasons for the improved results are not fully understood, it is believed that the DADS may remove sulfur deposits thereby conditioning the metal surface for deposition of the film forming corrosion inhibitor.

DESCRIPTION OF THE PREFERRED EMBODIMENTS

As indicated above, the presence of free sulfur in oil and gas well produced fluids can create plugging and corrosion problems. These problems may be particularly severe in the presence of hydrogen sulfide, carbon dioxide, and brine. If not treated with chemicals, the well can be damaged and nonproductive.

A formulation useful in the treatment of sulfur producing oil wells and gas wells should have the following properties:

(a) good sulfur solvency
(b) good corrosion inhibition
(c) inexpensive (d) nondamaging to equipment (non-metallic components)
(e) non-toxic
(f) easily disposable The method of the present invention employs a corrosion inhibitor formulation containing an effective amount of DADS and a film forming corrosion inhibitor which satisfies most of the above properties.

The method of the present invention has particular utility in the treatment of wells producing natural gas and free sulfur because of its dual function in dissolving the sulfur and protecting the well tubulars against corrosion. The term "tubulars" as used herein include both the well tubing and the well flow line.

Each of the essential components of the formulation, as well as other constituents and additives, are described in detail below.

DADS: Diaryldisulfide useable in the present invention has the following general formula $$R—S—S—R'$$

where:

R is an alkyl group or an aromatic group; and
R' is an aromatic group.

The preferred alkyl group contains from 1 to 12 carbon atoms and can be linear or branched. The preferred aromatic group for R and R' is a phenyl or substituted phenyl group wherein the substitution is an alkyl group containing from 1 to 3 carbon atoms.

DADS is available as a waste product generated from the caustic wash of sour naphthas in oil refineries. DADS is a mixture of compounds having the R—S—S—R' formula, where R in some of the compounds is alkyl and aromatic in others. R' in the mixture of compounds includes unsubstituted and substituted phenyl groups. Most of the DADS compounds are those wherein R and R' are different aromatic groups (e.g., phenyl groups).

DADS is commercially available from Merichem as a mixture of aryl, alkyl disulfides and diaryldisulfides, and can be produced by methods well known in the art.

DADS typically is a mixture of the following components:

| COMPONENTS | RANGE (wt %) |
|---|---|
| Alkyl phenyldisulfide | 20–30 |
| Diphenyldisulfide | 1–5 |
| Phenyltoluyldisulfide | 10–15 |
| Toluylethylphenyldisulfide | 10–20 |
| Diethylphenyldisulfide | 5–15 |
| Naphtha | 5–15 |

Corrosion Inhibitor: Film forming inhibitors are a well known class of corrosion inhibitors and operate by forming a barrier on the well tubulars. These inhibitors consist of one or more polar groups based on N,S, or O which are attracted to the metal or metal corrosion by-product surface. Nonpolar alkyl chains attached to the molecule are oleophilic and attract hydrocarbons to form an oily barrier on the metal surface of the well tubulars.

The preferred film forming inhibitors for use in the present invention are the amine acid or salts and imidazoline derivatives.

The fatty amine corrosion inhibitors are made by combining fatty amines with various fatty acids such as resin acids, tall oil acids, sulfurized tall oil fatty acids, dimer and trimer acids, naphthenic acids, lauric acids, oleic acids, and the like.

The imidazolines of the following structure are particularly preferred:

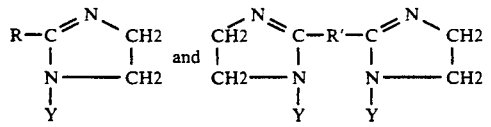

where:

R is an alkyl group containing from 10 to 20 carbon atoms;

R′ is an alkyl group containing from 10 to 40 carbon atoms; and

Y is H, C2H4OH, or C2H4NH2

A variety of these film forming corrosion inhibitors are commercially available.

Other constitutents: The formulation may also include solvents such as aromatic solvents and surfactants such as ethoxylated alcohols or ethoxylated alkyl phenols for dispersing the formulation in the produced fluids.

Formulation: The formulation will generally include the following package that can be premixed:

| | Broad Range (vol %) | Preferred Range (vol %) | Most Preferred Range |
|---|---|---|---|
| DADS | 60–99 | 75–95 | 75–93 |
| Film Former | 1–40 | 5–20 | 5–15 |
| Solvent | 0–30 | 0–5 | 1–5 |
| Surfactant | 0–20 | 0–5 | 0.5–3 |

Operation: Although each of the main components of the corrosion inhibitor formulation may be added separately, it is preferred to package them in a single formulation for introduction into the production stream.

The formulation may be batched into the stream but preferably is introduced continuously into the production stream at a subsurface location or at the surface. A conventional "macaroni" string fed by a chemical pump may be used to inject the formulation into the tubulars at a subsurface location. For surface injection, a chemical pump may be used to inject the chemical into the flow line.

The amount of the formulation actives injected will depend on the application. In the preferred application in produced fluids containing free sulfur, the DADS component should be at least 4–5 times (by weight) the amount of free sulfur in the fluid treated. In most application the concentration of the formulation in the produced fluid may range from 200 to 10,000 ppm (vol), preferably 1000 to 5000 ppm. It is also preferred that the volume ratio of DADS to corrosion inhibitor ranges from 20:1 to 1:1 and preferably 10:1 to 2:1 and most preferably 7:1 to 3:1.

EXPERIMENTS

Corrosivity tests were carried out in a rotating high pressure cell. The test equipment was as follows:

Coupons were cleaned and dipped in the treatment fluid (e.g., DADS and or corrosion inhibitor) for several minutes. The coupons then were dipped in water and placed in Autoclave Engineering stainless steel cells, each containing brine. The cells were pressurized with a charge gas to 1000 psi. The cells were placed in a wheel test cabinet at the test conditions and exposure times. After exposure, the coupons were cleaned and weighed and the corrosion rate (mpy) for each coupon determined.

The test materials and conditions were as follows:

| | |
|---|---|
| Temperature | 180 Degrees Fahrenheit |
| Brine | 1000 ppm chloride + Sulfur |
| Brine | 100% Brine |
| Hydrogen Sulfide | 5% of charge gas |
| Carbon Dioxide | 65% of charge gas |
| Nitrogen | 30% of charge gas |
| Total Pressure | 1000 psi at room temperature |
| Fluid Volume | 50 cc |
| Agitation | Rotation High Pressure Wheel Test |
| Coupon Type | 6″ × ⅛″ Rod 1018 Carbon Steel |
| Run Time | 24 Hours |

Additives

Corrosion Inhibitor (CI)—a fatty amine film forming corrosion inhibitor

DADS—(produced by Merichem)

Tests were carried out to ascertain the corrosion inhibition properties of (a) DADS alone with no elemental sulfur present and (b) DADS alone in the presence of elemental sulfur. The test data are showing in Table I.

TABLE I

| EXP NO. | DADS CONC. (PPM) | SULFUR (WPPM) | CORROSION RATE (MPY) |
|---|---|---|---|
| 1 | 0 | 400 | 225.3 |
| 2 | 1000 | 400 | 42.2 |
| 3 | 2000 | 400 | 25.8 |
| 4 | 5000 | 400 | 15.5 |
| 5 | 0 | NONE | 122.8 |
| 6 | 1000 | NONE | 145.7 |
| 7 | 2000 | NONE | 12.5 |
| 8 | 5000 | NONE | 4.7 |

These tests demonstrate unequivocally that DADS possess corrosion inhibition properties independent of its sulfur dissolution effects on corrosivity.

Additional tests were conducted to determine the corrosion protection obtained in the presence of both DADS and a film forming corrosion inhibitor. The environment contained 400 ppm sulfur.

TABLE II

| EXP NO. | CI CONC. (PPM) | DADS (PPM) | CORROSION RATE (MPY) |
|---|---|---|---|
| 9 | 0 | 0 | 196.0 |
| 10 | 1000 | 0 | 23.2 |
| 11 | 2000 | 0 | 19.1 |
| 12 | 0 | 5000 | 11.3 |
| 13 | 1000 | 5000 | 10.6 |
| 14 | 2000 | 5000 | 8.2 |
| 15 | 0 | 7000 | — |

The combination of the corrosion inhibitor and DADS provided the most protection. Note that Experiment No. 13 gave almost twice the protection of Experiment No. 11 at half the CI concentration. Since DADS costs far less than the commercial corrosion inhibition currently used in production operations, the combination of the CI and DADS is very cost effective.

Additional tests were conducted to determine the effects on corrosion by varying the relative amounts of the DADS and the film forming corrosion inhibitor (CI). The data obtained from these test are presented in Table III.

TABLE III

| EXP NO. | CI CONC. (PPM) | DADS (PPM) | CORROSION RATE (MPY) |
|---|---|---|---|
| 16* | 0 | 0 | 196.0 |
| 17 | 0 | 7000 | 12.5 |
| 18 | 1000 | 6000 | 6.9 |
| 19 | 2000 | 5000 | 6.3 |
| 20 | 3000 | 4000 | 6.1 |
| 21 | 4000 | 3000 | 6.6 |
| 22 | 5000 | 2000 | 7.0 |
| 23 | 6000 | 1000 | 8.2 |
| 24 | 7000 | 0 | 9.6 |

*The blank (Experiment No. 16) was determined in Experiment No. 9.

The above data demonstrate the synergistic effect of the combination of the film forming corrosion inhibitor and DADS on corrosion. The corrosion rate in the presence of both the CI and DADS is lower than that in the presence of each component alone. Note Experiment 19 at a DADS/CI volume ratio of 6:1 was lower than the CI at the same total concentration (7000 ppm).

What is claimed is:

1. A method of inhibiting the corrosion in the metal tubulars of a well producing oil or gas which contains corrosive amounts of hydrogen sulfide and free sulfur, said method comprises introducing into the produced oil or gas stream from 200 ppm to 10,000 ppm (vol) of a formulation comprising:

(a) a diaryldisulfide having the following formula:

R—S—S—R'

Where:

R is an alkyl group or an aromatic group; and

R' is an aromatic group; and (b) a film forming amine-based corrosion inhibitor having polar groups capable of attaching to the surface of the tubulars; the volume ratio of (a)/(b) being between 2:1 and 10:1.

2. The method of claim 1 wherein R is an aromatic group.

3. The method of claim 1 wherein the diaryldisulfide is a mixture of alkylaryl disulfides and diaryldisulfides.

4. The method of claim 1 wherein said volume ratio is between 3:1 and 7:1.

5. The method of claim 1 wherein the film forming corrosion inhibitor is an imidazoline corrosion inhibitor.

6. The method of claim 1 wherein the concentration of the formulation in the produced fluids is between 1000 to 5000 ppm by volume.

7. The method of claim 1 wherein the formulation also includes a surfactant selected from the group consisting of ethoxylated alcohols and ethoxylated alkyl phenols for dispersing the formulation in the produced oil or gas stream.

* * * * *